United States Patent
Jung et al.

(10) Patent No.: US 9,408,058 B2
(45) Date of Patent: Aug. 2, 2016

(54) DEVICE DISCOVERY METHOD AND APPARATUS OF WI-FI P2P DEVICE

(75) Inventors: Bu Seop Jung, Suwon-si (KR); Jhong Il Kim, Suwon-si (KR); Hyun Soo Kim, Yongin-si (KR); Jong Mu Choi, Gunpo-si (KR); Jung Hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 13/303,952

(22) Filed: Nov. 23, 2011

(65) Prior Publication Data

US 2012/0134349 A1    May 31, 2012

(30) Foreign Application Priority Data

Nov. 25, 2010 (KR) .................. 10-2010-0118111

(51) Int. Cl.
*H04W 84/02* (2009.01)
*H04W 8/00* (2009.01)
*H04W 76/02* (2009.01)

(52) U.S. Cl.
CPC ............ *H04W 8/005* (2013.01); *H04W 76/023* (2013.01)

(58) Field of Classification Search
CPC ... H04W 8/005; H04W 48/20; H04W 76/023; H04W 84/20; H04W 28/18; H04W 84/18; H04W 92/18; H04L 67/1051; H04L 61/2092
See application file for complete search history.

(56) References Cited

U.S. PATENT DOCUMENTS

| | | | |
|---|---|---|---|
| 7,948,925 B2* | 5/2011 | Miyabayashi et al. | 370/302 |
| 8,391,260 B1* | 3/2013 | Kopikare et al. | 370/338 |
| 8,954,502 B1* | 2/2015 | Kopikare et al. | 709/204 |
| 2011/0026504 A1* | 2/2011 | Feinberg | 370/338 |
| 2011/0161697 A1* | 6/2011 | Qi et al. | 713/320 |

* cited by examiner

Primary Examiner — David Oveissi
(74) *Attorney, Agent, or Firm* — Jefferson IP Law, LLP (57) ABSTRACT

A device discovery method and apparatus of a Wi-Fi Peer-to-Peer (P2P) device for improving connection compatibility with legacy devices are provided. The method includes receiving a command for executing a modified P2P device discovery mode, configuring the Wi-Fi P2P device as a group owner autonomously, entering a group owner receive mode in which a probe request can be received, and discovering an external device which transmits the probe request.

22 Claims, 7 Drawing Sheets

DEVICE DISCOVERY METHOD AND APPARATUS OF WI-FI P2P DEVICE

PRIORITY

This application claims the benefit under 35 U.S.C. §119(a) of a Korean patent application filed on Nov. 25, 2010 in the Korean Intellectual Property Office and assigned Serial. No. 10-2010-0118111, the entire disclosure of which is hereby incorporated by reference.

BACKGROUND OF THE INVENTION

1. Field of the Invention

The present invention relates to Wi-Fi communications. More particularly, the present invention relates to a device discovery method and apparatus of a Wi-Fi Peer-to-Peer (P2P) device for improving connection compatibility with legacy devices.

2. Description of the Related Art

Wi-Fi Peer-to-Peer or Wi-Fi direct is a technology that allows Wi-Fi-enabled devices to communicate directly with each other without involvement of an Access Point (AP) (i.e., a conventional network). The conventional Wi-Fi technology supports access to the Internet via an AP but not direct communication among Wi-Fi devices. Currently, such a direct radio communication is supported by Bluetooth. However, taking into consideration the limits of Bluetooth regarding its communication range and data rate, it is expected that Wi-Fi P2P technology may replace Bluetooth technology.

Although there is a direct connection technology called ad hoc networking, the ad-hoc networking has some drawbacks such as poor security, high power consumption, and 11 Mbps throughput limitation. The Wi-Fi P2P technology supports the security mode of Wi-Fi Protected Access 2 (WPA2) to improve the security and simplifies the connectivity among Wi-Fi devices with Wi-Fi Simple Configuration (WSC). The Wi-Fi P2P technology also supports 802.11n so as to improve throughput as compared to the ad-hoc networking.

Figure 1:
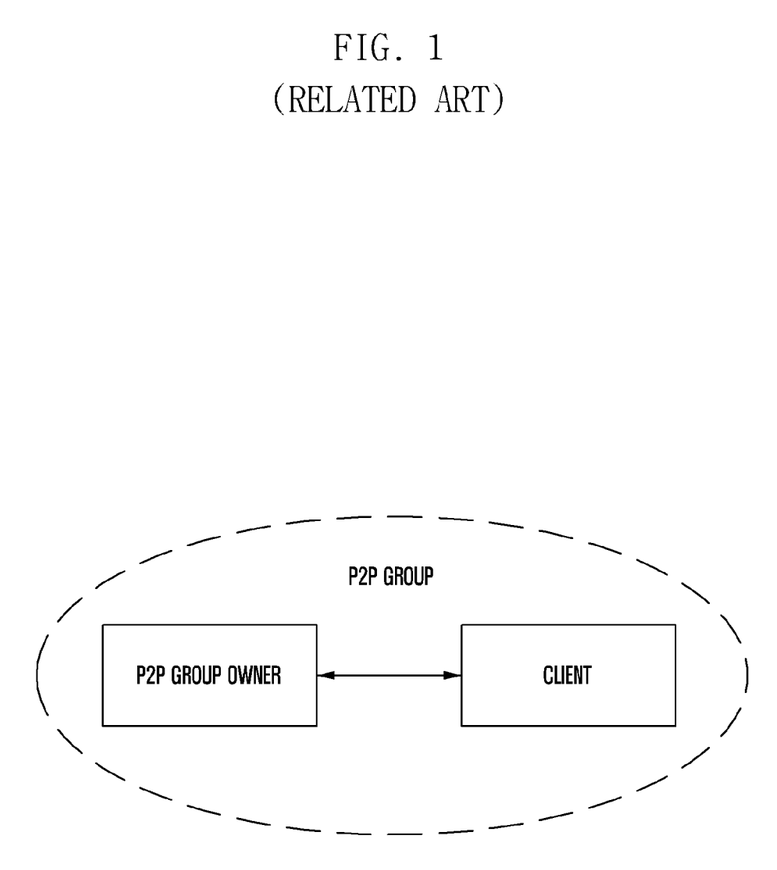
FIG. 1 is a schematic diagram illustrating Wi-Fi Peer-to-Peer (P2P) components of the related art.

FIG. 1 is a schematic diagram illustrating Wi-Fi P2P components of the related art.

Referring to FIG. 1, the Wi-Fi P2P includes a P2P Group Owner and a client. The P2P Group Owner is responsible for the functions of the legacy AP of a Wireless Local Area Network (WLAN), and the client acts as a station of the WLAN. In a P2P group, the P2P group owner is determined according to a P2P protocol called Group Owner Negotiation that is performed after a device discovery process.

A P2P group based on the Wi-Fi P2P technology is created in 1:1 connection or 1:N connection between the P2P group owner and the client, and the number of connectable clients is determined according to the capacity of the P2P group owner.

Here, a legacy Wi-Fi device can attempt to make a connection as a client of the P2P group. In the Wi-Fi P2P technology, the Wi-Fi P2P device functioning as the group owner allows connection of the legacy device. The legacy device can be made aware of the existence of an AP-like group owner acting as an AP.

In order for the legacy device to recognize the existence of the Wi-Fi P2P device, the Wi-Fi P2P device should operate as the group owner. In the device discovery process before the determination of the roles in the P2P group, the Wi-Fi P2P device does not respond to the probe request of the legacy device and, as a consequence, the legacy device cannot discover the Wi-Fi P2P device in a scanning process.

When the user intends to connect the Wi-Fi P2P device to the legacy device, it is necessary to perform the device discovery process. However, since the legacy device cannot transmit a probe response, the connection between the legacy device and the Wi-Fi P2P device can be established only after the legacy device has discovered the Wi-Fi P2P device through scanning. However, since the Wi-Fi device cannot respond to the probe request of the legacy device before it becomes the group owner, this causes a connection delay between the Wi-Fi P2P device and the legacy device.

SUMMARY OF THE INVENTION

Aspects of the present invention are to address at least the above-mentioned problems and/or disadvantages and to provide at least the advantages described below. Accordingly, an aspect of the present invention is to provide a device discovery method and apparatus of a Wi-Fi Peer-to-Peer (P2P) device that enables a legacy device to determine the existence of the Wi-Fi P2P device and to request for connection.

According to an aspect of the present invention, a device discovery method of a Wi-Fi P2P device is provided. The method includes receiving a command for executing a modified P2P device discovery mode, configuring the Wi-Fi P2P device as a group owner autonomously, entering a group owner receive mode in which a probe request can be received, and discovering an external device which transmits the probe request.

According to another aspect of the present invention, a Wi-Fi Peer-to-Peer (P2P) device is provided. The device includes a Wi-Fi communication unit for performing communication with one of another Wi-Fi P2P device and a legacy device, a discovery mode configuration module for configuring the Wi-Fi P2P device with a modified P2P device discovery mode, a group owner configuration module for configuring the Wi-Fi P2P device as a group owner autonomously, and an operation execution module for entering a group owner received mode and for discovering an external device transmitting a probe request.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 2:
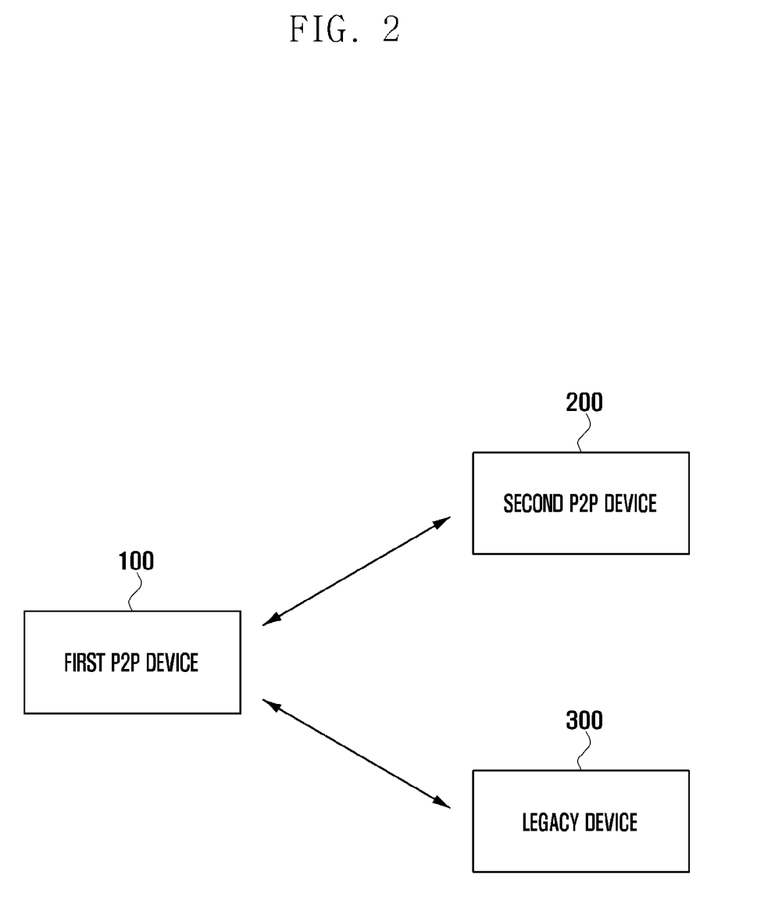
FIG. 2 is a diagram illustrating communication between Wi-Fi P2P devices and between Wi-Fi P2P and legacy devices according to an exemplary embodiment of the present invention.

FIG. 2 is a diagram illustrating communication between Wi-Fi Peer-to-Peer (P2P) devices and between Wi-Fi P2P and legacy devices according to an exemplary embodiment of the present invention.

Referring to FIG. 2, a first P2P device 100 is a Wi-Fi P2P device that supports normal P2P device discovery mode and modified P2P device discovery mode such that the user can execute either of the discovery modes selectively. In an exemplary implementation, the first P2P device 100 can be configured to support the modified P2P device discovery mode. When it operates in the modified P2P device discovery mode, the first P2P device 100 configures itself as the group owner. That is, the first P2P device 100 becomes an autonomous group owner to work as the group owner. The first P2P device 100 enters the group owner receive mode to configure a specific channel as an operating channel to wait for receipt of a probe request. If a second P2P device 200 as an external Wi-Fi P2P device or a legacy device 300 transmits a probe request on the operating channel of the first P2P device 100, the first P2P device 100 receives the probe request and transmits a probe response to the second P2P device 200 or the legacy device 300.

Upon receipt of the probe request, the first P2P device 100 can determine whether the device that transmitted the probe request is a Wi-Fi P2P device or a legacy device. The probe request transmitted by the Wi-Fi P2P device includes a P2P Information Element (P2P IE), but the probe request transmitted by the legacy device does not include a P2P IE. Accordingly, the first P2P device 100 can determine whether the device that transmitted the probe request is a P2P device or a legacy device by referencing the probe request. If it is determined that the device that transmitted the probe request is a P2P device, the first P2P device 100 transmits a probe response including P2P group information (e.g., P2P IE, P2P Device ID, etc.). If it is determined that the device that transmitted the probe request is a legacy device, the first P2P device 100 transmits a probe response having no P2P group information.

The first P2P device 100 also transmits a beacon notifying of a Timing Synchronization Function (TSF) for timing synchronization along with the probe response. After an authentication process between the first and second P2P devices 100 and 200 and between the first P2P and legacy devices 100 and 300, connections are established therebetween. The first P2P device 100 operates as the group owner, and the second P2P device 200 and the legacy device 300 operate as clients.

Figure 3:
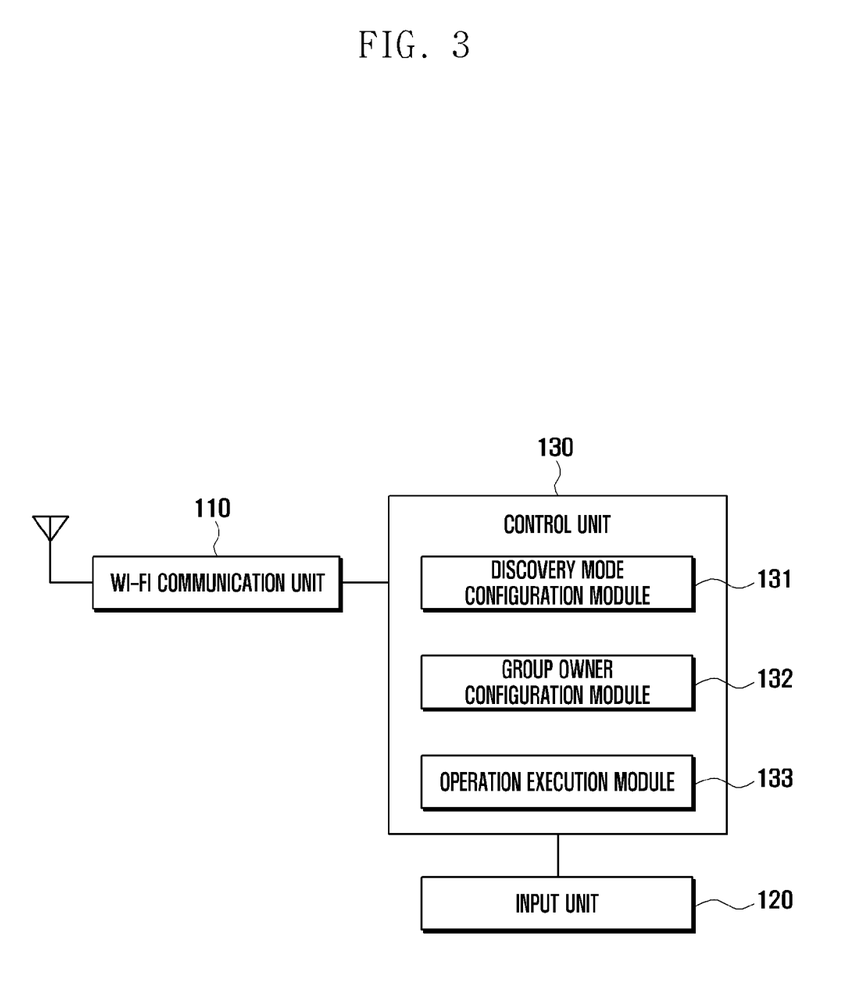
FIG. 3 is a block diagram illustrating a configuration of a first P2P device according to an exemplary embodiment of the present invention.

FIG. 3 is a block diagram illustrating a configuration of a first P2P device according to an exemplary embodiment of the present invention.

Referring to FIG. 3, the first P2P device includes a Wi-Fi communication unit 110, an input unit 120, and a control unit 130.

The Wi-Fi communication unit 110 is responsible for radio communication with an external Wi-Fi terminal or an Access Point (AP). If a probe request is received when the first P2P device 100 operates in a group owner receive mode, the Wi-Fi communication unit 110 transmits a probe response to the device that transmitted the probe request. The Wi-Fi communication unit 110 of the first P2P device 100 transmits the probe request over all of the channels in scan mode and over a social channel in search mode.

The input unit 120 receives a command input by a user and generates an input signal corresponding to the user command. The input unit 120 generates a device discovery start command signal in response to a user input. The input unit 120 can generate a normal P2P discovery mode start command signal and a modified P2P device discovery mode start command signal.

The control unit 130 is responsible for controlling overall operations of the first P2P device 100. The control unit 130 includes a discovery mode configuration module 131, a group owner configuration module 132, and an operation execution module 133.

The discovery mode configuration module 131 is responsible for configuring the discovery mode of the first P2P device 100. In an exemplary implementation, the first P2P device 100 supports the normal P2P device discovery mode and the modified P2P device discovery mode. The discovery mode configuration module 131 provides a menu screen on which one of the normal P2P device discovery mode and the modified P2P device discovery mode is selected and, if the user selects one of the device discovery modes, configures the device with the selected P2P device discovery mode. When the modified P2P device discovery mode is selected by the user, the discovery mode configuration module 131 configures the modified P2P device discovery mode and notifies the group owner configuration module 132 of the configuration information.

The group owner configuration module 132 is responsible for autonomously configuring the first P2P device 100 as the group owner. If it is notified by the discovery mode configuration module 131 that the modified P2P device discovery mode is configured, the group owner configuration module 132 configures the first P2P device 100 as the group owner autonomously and notifies the operation execution module 133 of the configuration result.

The operation execution module 133 is responsible for discovering external devices and establishing connections to the discovered devices. Referring to FIG. 2, the first P2P device 100 discovers the second P2P device 200 and/or the legacy device 300 and establishes a connection to the discovered device. If it is informed by the group owner configuration module 132 that the first P2P device 100 is configured as the group owner, the operation execution module 133 enters the group owner receive mode. In an exemplary implementation, the group owner receive mode is an operation mode in which a specific channel is configured as an operating channel on which the probe response is transmitted in response to a probe request while transmitting the beacon. If the probe request is received from an external device by means of the Wi-Fi communication unit 110, the operation execution module 133 transmits the probe response to the external device to discover and establish a connection with the external device.

The operation execution module 133 scans all of the channels by means of the Wi-Fi communication unit 110. In the group owner receive mode, the operation execution module 133 starts a timer having a predetermined time period and, when the time period expires, enters the scan mode to scan all of the channels. If all of the channels have been scanned completely, the operation execution module 133 returns to the group owner receive mode and determines whether a probe request is received via the Wi-Fi communication unit 110. Simultaneously with the return to the group owner receive mode, the operation execution module 133 starts a timer and, when the timer expires, enters the search mode to scan the social channel by means of the Wi-Fi communication unit 110. According to an exemplary embodiment of the present invention, the social channel is the commonly used 2.4 GHz band channels 1, 6, and 11. In case that the user-intended device is discovered in the search mode, the operation execution module 133 establishes a connection with the device according to the user input.

After completing the social channel scan, the operation execution module 133 returns to the group owner receive mode and determines whether the probe request is received by means of the Wi-Fi communication unit 110. Afterward, the operation execution module 133 enters the search mode and the group owner receive mode alternatively.

Figure 4:
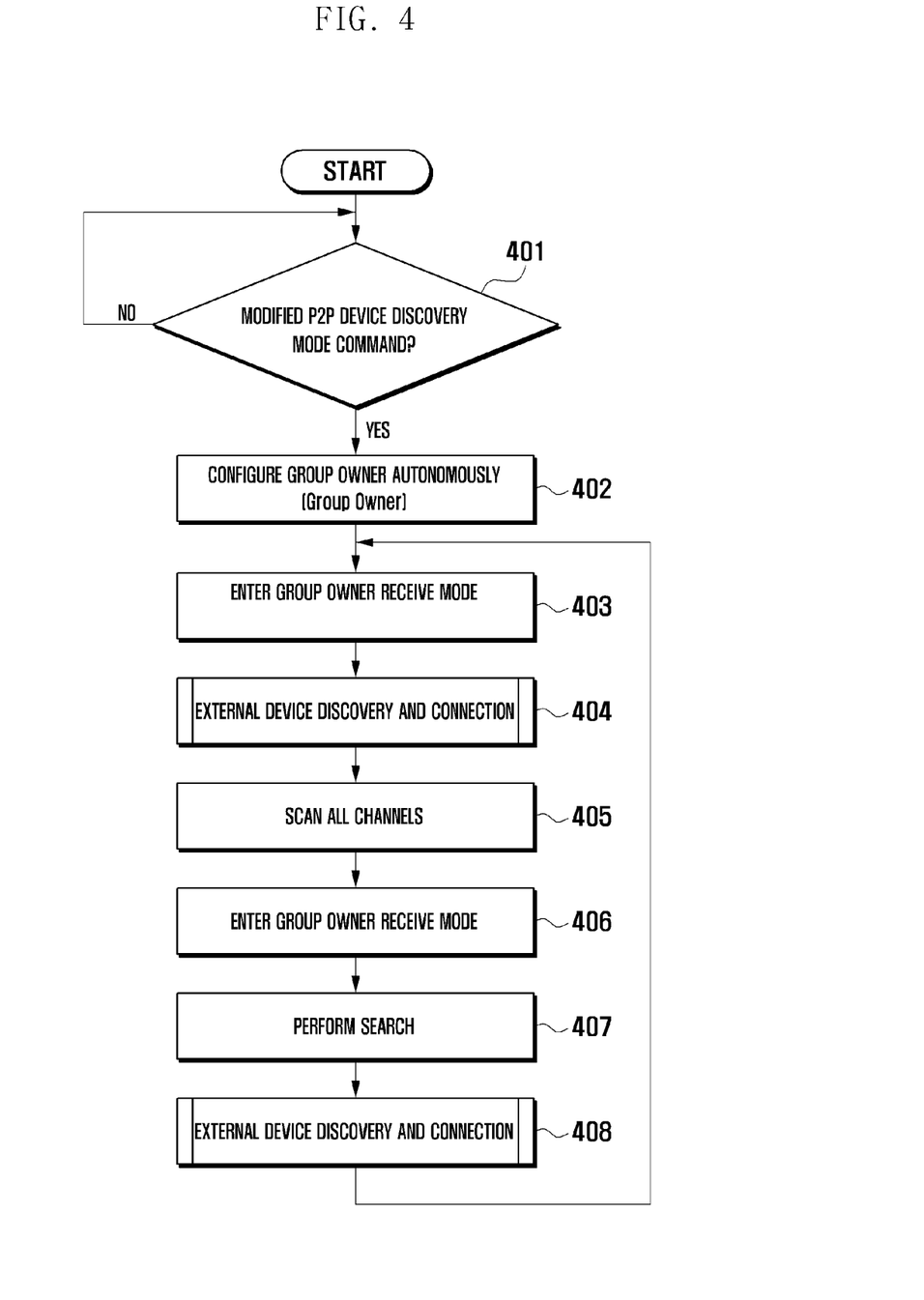
FIG. 4 is a flowchart illustrating a device discovery method of a first P2P device according to an exemplary embodiment of the present invention.

FIG. 4 is a flowchart illustrating a device discovery method of a first P2P device according to an exemplary embodiment of the present invention.

Referring to FIG. 4, a control unit monitors to detect a command input for executing the modified P2P device discovery mode through an input unit in step 401. In order for the device to enter the discovery mode, the user executes a specific application using Wi-Fi P2P or generates a trigger signal by inputting a specific key such as Wi-Fi Simple Configuration (WSC) button. According to an exemplary embodiment of the present invention, the first P2P device can configure the device with one of the normal P2P device discovery mode and the modified P2P device discovery mode. The control unit controls the display unit of the first P2P device to display a menu screen having the options of the normal P2P device discovery mode and the modified P2P device discovery mode such that the user can select either of the discovery modes. If the user selects the modified P2P device discovery mode by means of an input unit, the control unit detects the selection of the modified P2P device discovery mode such that a discovery mode configuration module configures the device with the modified P2P device discovery mode. Afterward, the discovery mode configuration module transfers the configuration information to a group owner configuration module.

The group owner configuration module configures the first P2P device as the group owner autonomously in step 402. The group owner configuration module transfers the configuration information to an operation execution module, and the operation execution module enters the group owner receive mode in step 403. When configuring the operating channel, the operation execution module configures the social channel as the operating channel. According to an exemplary embodiment of the present invention, the social channel is the commonly usable 2.4 GHz band channels 1, 6, and 11. The reason why the social channel is configured as the operating channel is to support the listen mode of the normal P2P device discovery.

Afterward, the operation execution module discovers an external device and establishes a connection with the external device in step 404. The operation execution module can receive both the probe request from the Wi-Fi P2P and legacy devices and transmit the probe response to those devices. In this manner, the operation execution module can discover the external devices. Since it is configured as the group owner, the first P2P device can establish a connection with the external device without a Group Owner (GO) negotiation process. In case there is no device transmitting the probe request at step 404, step 404 can be omitted.

The operation execution module scans all of the channels in step 405. The operation execution module enters the scan mode to perform scanning on all of the channels by means of a Wi-Fi communication unit. The operation execution module enters the group owner receive mode that includes starting a timer having a predetermined period and, when the timer expires, enters the scan mode to scan all of the channels.

The operation execution module returns to the group owner receive mode to monitor for receipt of the probe request in step 406. The operation execution module starts a timer having a predetermined period upon the return to the group owner receive mode and, when the timer expires, enters the search mode to scan the social channel by means of the Wi-Fi communication unit in step 407. In an exemplary implementation, the timer is set to a value between 100 ms and 300 ms.

In the search mode, the operation execution module can perform the service discovery additionally. The service discovery is a message exchange for determining the service protocol type available for the device and service information. Although two Wi-Fi P2P devices are connected with each other, if the devices support different service protocol types and service information, it is impossible to exchange data. Accordingly, the communication execution module determines whether it is possible to communicate with the device discovered in the service discovery process.

The operation execution module discovers an external device and establishes a connection with the external device in step 408. The operation execution module transmits the probe request to the external device and receives the probe response from the external device. Since the first P2P device is configured as the group owner, it is possible to establish a connection with the external device without performing the group owner determination process. If there is no external device transmitting the probe response, step 408 can be omitted.

According to an exemplary embodiment of the present invention, the first P2P device can receive the probe request from the legacy device as well as the Wi-Fi P2P device and discover the corresponding device by transmitting the probe response in the group owner receive mode. The first P2P device also can discover the user-intended device by performing a search periodically and establish a connection with the device. Since the first P2P device is configured as the group owner already, there is no need to perform the GO negotiation for determining the group owner, resulting in reduction of connection delay.

Figure 5:
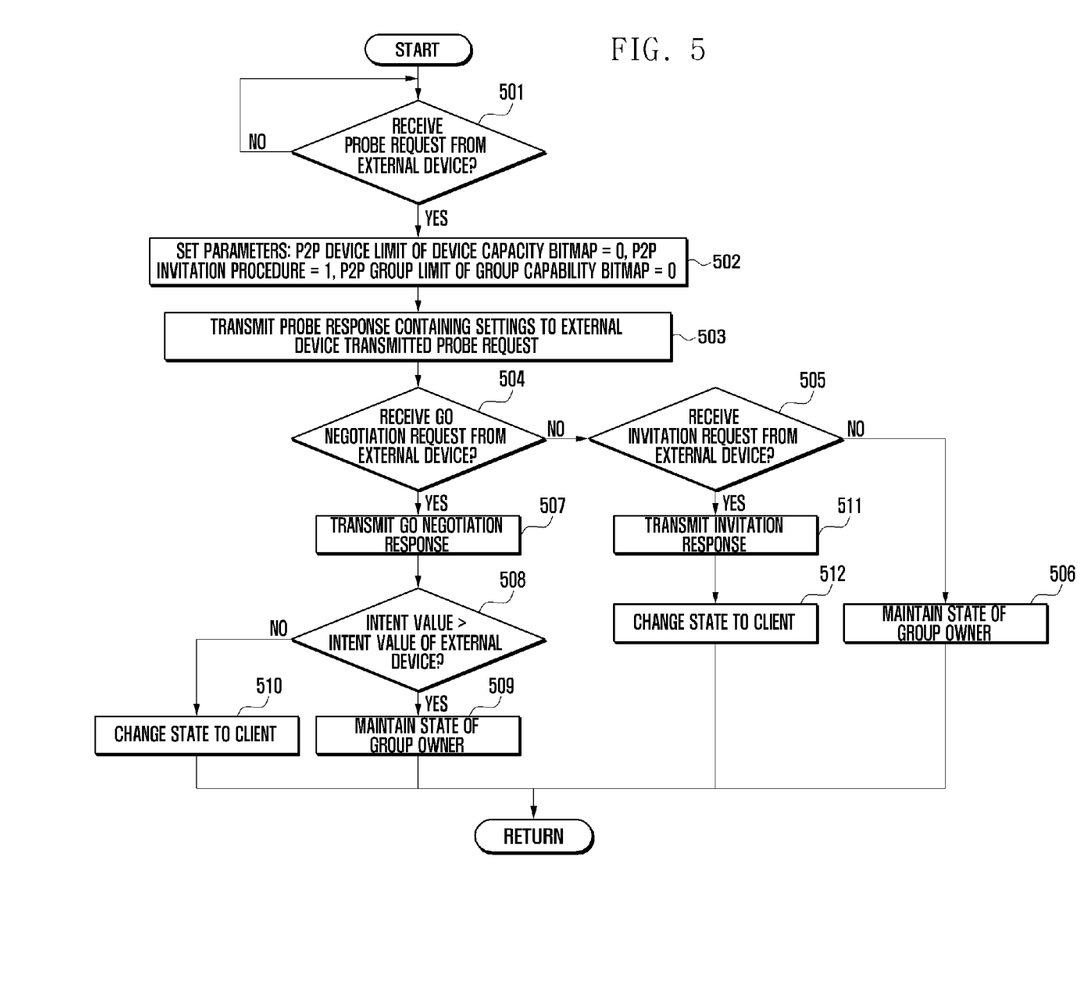
FIG. 5 is a flowchart illustrating an external device discovery and connection method according to an exemplary embodiment of the present invention.

FIG. 5 is a flowchart illustrating an external device discovery and connection method according to an exemplary embodiment of the present invention.

Referring to FIG. 5, an operation execution module determines whether a probe request is received from the external device by means of a Wi-Fi communication unit in step 501. If the probe request is received at step 501, the operation execution module sets P2P Device Limit of Device Capacity Bitmap to 0, the P2P Invitation Procedure to 1, and the P2P Group Limit of Group Capability Bitmap to 0 in step 502.

The probe request transmitted by the Wi-Fi P2P device and the probe response include a P2P Information Element (IE). The P2P IE is formatted as shown in Table 1.

TABLE 1

| Field | Size (Octets) |
| --- | --- |
| Element ID | 1 |
| Length | 1 |
| OUI | 3 |
| OUI Type | 1 |
| P2P Attribute | Variable |

In Table 1, 'P2P Attribute' denotes the attribute information of the Wi-Fi P2P device. 'P2P Attribute' is composed of three fields, i.e. 'Attribute ID', 'Length', and 'Attribute body field', and the 'Attribute ID' is in the range from 0 to 221. Here, the Attribute ID '2' corresponds to 'P2P Capacity' and the P2P Capacity attribute is formatted as shown in Table 2.

TABLE 2

| Field | Size (Octets) |
| --- | --- |
| Attribute ID | 1 |
| Length | 2 |
| Device Capability Bitmap | 1 |
| Group Capability Bitmap | 1 |

In Table 2, 'Device Capability Bitmap' is a set of parameters indicating the capability of the P2P device, and 'Group Capability Bitmap' is a set of the parameters indicating the current status of the P2P group.

The parameters of 'Device Capability Bitmap' are defined as shown in Table 3, and the parameters of 'Group Capability Bitmap' are defined as shown in Table 4.

TABLE 3

| Bit(s) | Information |
| --- | --- |
| 0 | Service Discovery |
| 1 | P2P Client Discoverability |
| 2 | Concurrent Operation |
| 3 | P2P Infrastructure Managed |
| 4 | P2P Device Limit |
| 5 | P2P Invitation Procedure |
| 6-7 | Reserved |

TABLE 4

| Bit(s) | Information |
| --- | --- |
| 0 | P2P Group Owner |
| 1 | Persistent P2P Group |
| 2 | P2P Group Limit |
| 3 | Intra-BSS Distribution |
| 4 | Cross Connection |
| 5 | Persistent Reconnect |
| 6 | Group Formation |
| 7 | Reserved |

In Table 3, if the Wi-Fi P2P device cannot participate in other P2P groups, the P2P Device Limit field is set to 1 and, otherwise, is set to 0. Also, if the Wi-Fi P2P device can processes the P2P Invitation Procedure signaling, the P2P Invitation Procedure field is set to 1 and, otherwise, is set to 0.

In Table 4, if the P2P group owner cannot allow other clients to take part in the P2P group, the P2P Group Limit field is set to 1 and, otherwise, is set to 0.

According to an exemplary embodiment of the present invention, the operation execution module sets the P2P Device Limit of the Device Capacity Bitmap to 0, the P2P Invitation Procedure to 1, and the P2P Group Limit of Group Capability Bitmap to 0. If the P2P Device Limit is set to 0, this means that the first P2P device can take part in other P2P groups. And, if the P2P Invitation Procedure is set to 1, this means that the first P2P device permits the inviting of other devices to join the group or that it can be invited by another device. If the P2P Group Limit field is set to 1, this means that the first P2P device allows other devices to take part in its group.

After setting the parameters at step 502, the operation execution module transmits the probe response containing the configuration information to the external device transmitted the probe request by means of the Wi-Fi communication unit in step 503. In this manner, the first P2P device can discover the external device.

The operation execution module determines whether a GO negotiation request is received from the external device by means of the Wi-Fi communication unit in step 504. Although the first P2P device operates as the group owner, the external device that is not a client of the group of which the first P2P device is the group owner may want to be the group owner. In this case, the external device transmits the GO negotiation request to the first P2P device. The operation execution module receives the GO negotiation request by means of the Wi-Fi communication unit. If the GO negotiation request is received at step 504, the operation execution module transmits a GO negotiation response to the external device in step 507. The GO negotiation request and GO negotiation response include an intent value necessary for determining the group owner, and the first P2P device and the external device compare their intent values with each other to determine the group owner in step 508. If the intent value of the first P2P device is greater than the intent value of the external device, the operations execution module maintains the group owner status of the first P2P device in step 509. Otherwise, the first P2P device is configured as a client in step 510. That is, the first P2P device stops operating as the group owner and, as a client, takes part in the P2P group of which the group owner is the external device. After the GO negotiation process, the first P2P device operates as a Wi-Fi Simple Configuration (WSC) registrar, and the external device operates as a WSC Enrollee so as to perform provisioning for exchanging credentials as the information necessary to participate in the P2P group. The external device accesses the first P2P device, i.e. the group owner, using the credential such that a connection is established between the two devices.

If the GO negotiation request is not received at step 504, the operation execution module determines whether an invitation request is received from the external device by means of the Wi-Fi communication unit in step 505. The external device that is not the client of the group of which the first P2P device is the group owner wants the first P2P device to take part in the group to which the external device belongs. In this case, the external device can determine that the P2P Invitation Procedure field of the first P2P device is set to 1 and transmit the invitation request to the first P2P device. The operation execution module receives the invitation request transmitted by the external device by means of the Wi-Fi communication unit. Since the P2P Invitation Procedure is set to 1, the first P2P device can process the invitation request transmitted by the external device. Upon receipt of the invitation request by means of the Wi-Fi communication unit, the operation execution module transmits the invitation response to the external device in step 511. According to an exemplary embodiment of the present invention, the operation execution module receives the invitation request and controls the display unit to display a message asking whether to accept the invitation. If the user inputs a command to accept the invitation, the operation execution module transmits an invitation response to the external device by means of the Wi-Fi communication unit. The operation execution module configures the first P2P device as a client in step 512. If no invitation request is received from the external device at step 505, the operation execution module maintains the group owner state of the first P2P device in step 506. That is, if a GO negotiation request is not received at step 504 and if an invitation request is not received at step 505, the first P2P device makes the device which transmitted the probe request participate in its group as a client while maintaining its state as the group owner. The external device can determine the P2P Group Limit field of the first P2P device which is set to 0 and attempt connection to the first P2P device without a GO negotiation process.

Unlike the conventional method in which the Wi-Fi P2P devices has to perform the GO negotiation process for establishing a group, the present invention allows the external device to take part in the P2P group as a client without performing the GO negotiation process because the group owner is determined.

Figure 6:
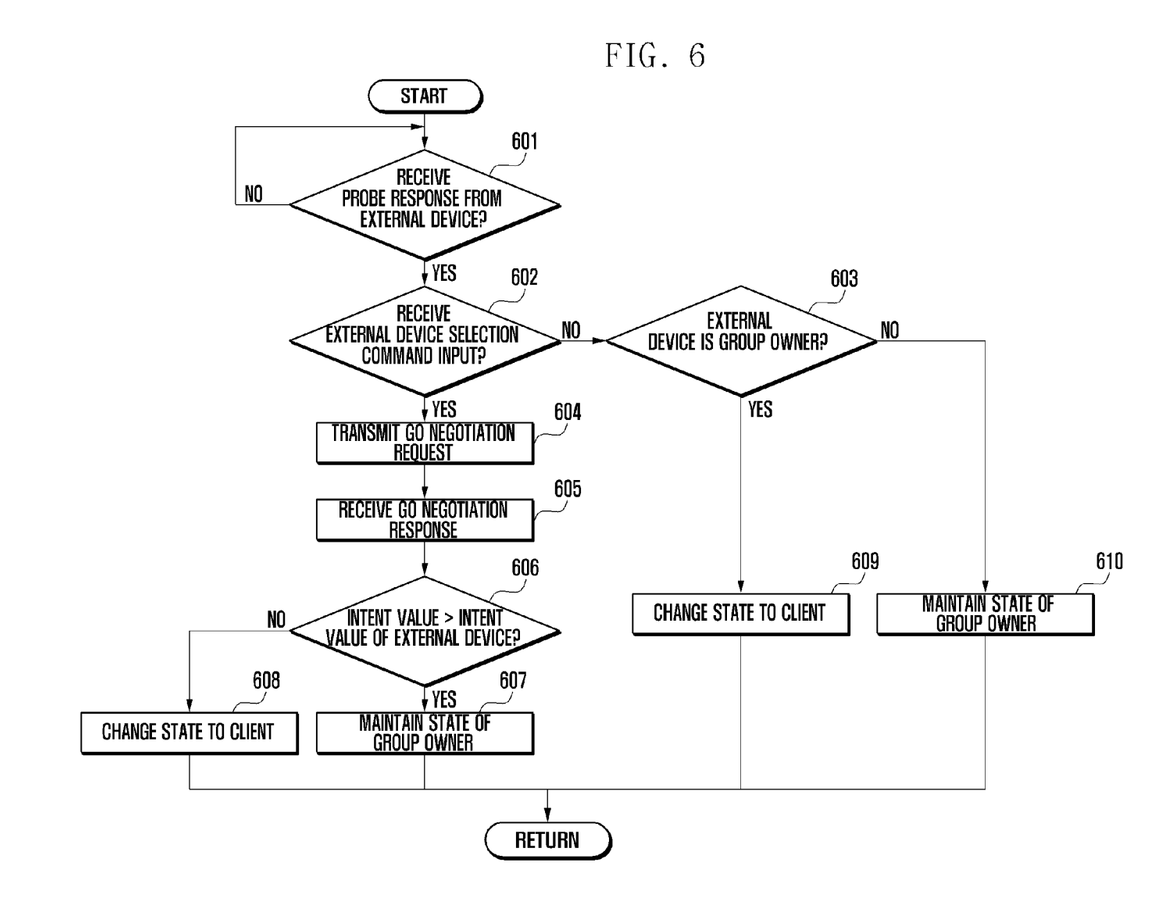
FIG. 6 is a flowchart illustrating an external device discovery and connection method according to an exemplary embodiment of the present invention.

FIG. 6 is a flowchart illustrating an external device discovery and connection method according to an exemplary embodiment of the present invention.

Referring first to step 407 of FIG. 4, the operation execution module transmits the probe request by means of the Wi-Fi communication unit. At this time, the operation execution module sets the P2P Device Limit of Device Capacity Bitmap to 0, P2P Invitation Procedure to 1, and P2P Group Limit of Group Capability Bitmap to 0, and transmits the probe request containing the parameters set as above.

Referring to FIG. 6, the operation execution module determines whether a probe response is received from the external device by means of the Wi-Fi communication unit in step 601. If the probe request is received, the external device transmits the probe response to the first P2P device. If a probe response is received, this means that the operation execution module discovers the external device transmitted the probe response.

Upon receipt of the probe response, the operation execution module determines whether a command for selecting the discovered device is input through the input unit in step 602. If the user-intended device has been found, the user can input the command for selecting the device by means of the input unit.

Although the first P2P device is the group owner currently, the group owner can be changed. If the user selects one of the external devices that have transmitted the probe response, the operation execution module controls the Wi-Fi communication unit to transmit the GO negotiation request to the selected external device in step 604. Upon receipt of the GO negotiation request, the external device transmits the GO negotiation response to the first P2P device. The operation execution module receives the GO negotiation response by means of the Wi-Fi communication unit in step 605 and compares the intent values of the GO negotiation request and response with each other to determine the group owner in step 606. If the intent value of the first P2P device is greater than that of the external device, the operation execution module maintains the state of the first P2P device as the group owner in step 607 and, otherwise, changes the state of the first P2P device to client in step 608.

If an external device is not selected at step 602, the operation execution module determines whether the external device that transmitted the probe response is a group owner in step 603. If it is determined that the external device is a group owner, the operation execution module changes the state of the first P2P device to client in step 609.

Otherwise, if it is determined that the external device is not a group owner at step 603, the operation execution module maintains the state of the first P2P device as group owner in step 610. That is, if the probe response is received, the first P2P device has the external device that transmitted the probe response join the group as a client while maintaining its state as the group owner.

In case that an external device is selected by the user command at step 602, the operation execution module controls the wireless communication unit to transmit the invitation request and, if the invitation response is received, establishes a connection with the external device that transmitted the invitation response while maintaining its state as group owner. Since the P2P Invitation Procedure field is set to 1 and P2P Group Limit field is set to 0, the first P2P device can have other device join its group.

Figure 7:
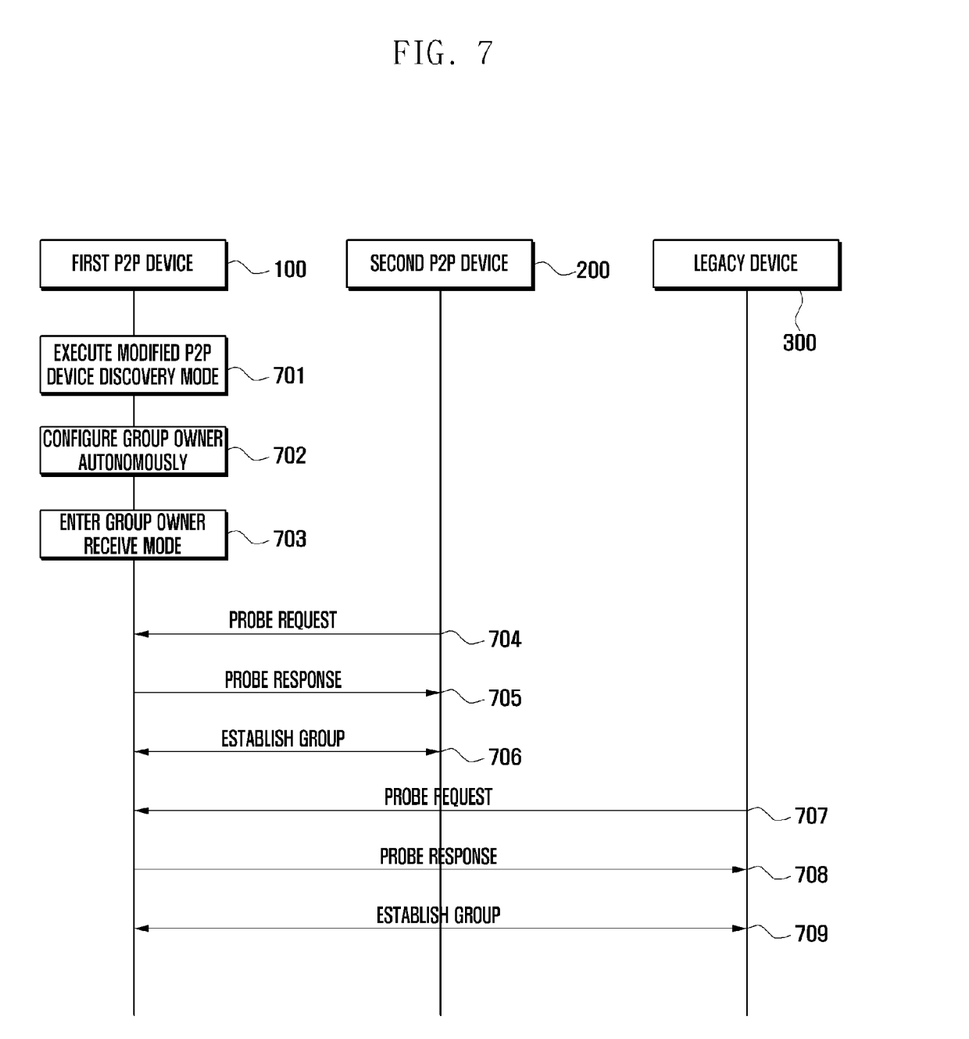
FIG. 7 is a signaling diagram illustrating operations between a first P2P device and a second P2P and legacy devices in a device discovery method according to an exemplary embodiment of the present invention.

FIG. 7 is a signaling diagram illustrating operations between a first P2P device and a second P2P and legacy devices in a device discovery method according to an exemplary embodiment of the present invention.

Referring to FIG. 7, the first P2P device 100 executes a modified P2P device discovery mode in step 701. The first P2P device 100 configures itself as the group owner autonomously in step 702 and enters the group owner receive mode in step 703. The first P2P device 100 configures one of the social channels as the operating channel to wait for receiving a probe request.

If the second P2P device 200 transmits the probe request to the first P2P device 100 in step 704, the first P2P device 100 transmits the probe response to the second P2P device 200 in step 705. In this manner, the first P2P device discovers the second P2P device 200. Afterward, the first P2P device 100 establishes the P2P group composed of the first P2P device 100 as the group owner and the second P2P device 200 as a client in step 706.

If the legacy device 300 transmits the probe request to the first P2P device 100 in step 707, the first P2P device 100 transmits the probe response to the legacy device in step 708. In this manner, the first P2P device discovers the legacy device 300. Afterward, the first P2P device 100 establishes the P2P group composed of the first P2P device 100 as the group owner and the legacy device 300 as a client in step 709.

As described above, an exemplary device discovery method of the present invention enables a Wi-Fi P2P device to discover legacy devices as well as Wi-Fi P2P devices. That is, an exemplary device discovery method of the present invention is capable of addressing the problem of the conventional method in which the legacy device cannot join the device discovery process while the Wi-Fi device users are commanding to establish P2P connections.

Also, an exemplary device discovery method of the present invention is advantageous to provide backward compatibility to the legacy devices in the environment where the Wi-Fi P2P is commercialized, resulting in contribution to the establishment of a Wi-Fi P2P standard at the initial stage of commercialization.

Furthermore, an exemplary device discovery method of the present invention determines the group owner in advance such that the external devices can attempt to access the group owner as clients without performing Group Owner Negotiation process, resulting in reduction of P2P connection delay.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of establishing a Wi-Fi Peer-to-Peer (P2P) connection in an electronic device, the method comprising:
receiving a command issued by a user for executing a Wi-Fi P2P discovery mode in which the electronic device configures itself as a group owner;
self-configuring the electronic device as a group owner autonomously without a group owner negotiation process;
configuring the electronic device to enter a first mode where the electronic devices is configured to receive a first probe request transmitted from at least one other electronic device during a first period;
configuring the electronic device to enter a second mode where the electronic device is configured to scan social channels during a second period; and
periodically cycling the configuring of the electronic device to enter the first mode and the configuring of the electronic device to enter the second mode while the electronic device maintains being configured as the group owner.

2. The method of claim 1, wherein in the first mode, the electronic device is further configured to:
receive a first probe request transmitted from at least one other electronic device; and
transmit a first probe response to the at least one other electronic device in response to the first probe request.

3. The method of claim 2, further comprising:
in response to receipt of the first probe request, determining whether the at least one other electronic device transmitting the first probe request is a Wi-Fi P2P device or a legacy device.

4. The method of claim 3,
wherein the first probe request transmitted from the Wi-Fi P2P device includes a P2P information element, and
wherein the first probe request transmitted from the legacy device does not include the P2P information element.

5. The method of claim 3,
wherein the first probe response includes P2P group information, if the at least one other electronic device is the Wi-Fi P2P device; and
wherein the first probe response does not include the P2P group information, if the at least one other electronic device is the legacy device.

6. The method of claim 5, wherein the P2P group information comprises at least one of a P2P information element and a P2P device identification.

7. The method of claim 2, further comprising:
transmitting a beacon notifying of a Timing Synchronization Function (TSF) for timing synchronization to the at least one other electronic device, when transmitting the first probe response.

8. The method of claim 1, wherein, in the second mode, the electronic device is further configured to:
transmit a second probe request over social channels; and
receive a second probe response transmitted from at least one other electronic device in response to the second probe request.

9. The method of claim 1, further comprising:
configuring the electronic device to enter a third mode where the electronic device is configured to scan all of channels.

10. The method of claim 1, further comprising:
negotiating, by the electronic device, with the at least one other electronic device for configuring the group owner.

11. The method of claim 1, further comprising:
receiving a command issued by a user for forming a P2P group, if the electronic device discovers at least one other electronic device;
transmitting, by the electronic device, an invitation request to the discovered at least one other electronic device; and
establishing the Wi-Fi P2P connection between the electronic device and the discovered at least one other electronic device, upon receipt of an invitation response transmitted from the discovered at least one other electronic device.

12. An electronic device comprising:
a communication unit configured to perform Wi-Fi communication with at least one other electronic device; and
a controller configured to:
receive a command issued by a user for executing a Wi-Fi P2P discovery mode in which the electronic device configures itself as a group owner;
self-configure the electronic device as a group owner autonomously without a group owner negotiation process;
configure the electronic device to enter a first mode where the electronic device is configured to receive a first probe request transmitted from at least one other electronic device during a first period;
configure the electronic device to enter a second mode where the electronic device is configured to scan social channels during a second period; and
periodically cycle the configuring of the electronic device to enter the first mode and the configuring of the electronic device to enter the second mode, while the electronic device maintains being configured as the group owner.

13. The electronic device of claim 12, wherein the controller is further configured to control the communication unit to:
receive a first probe request transmitted from at least one other electronic device; and
control the communication unit to transmit a first probe response to the at least one other electronic device in response to the first probe request.

14. The electronic device of claim 13, wherein the controller is further configured to, in response to receipt of the first probe request, determine whether the at least one other electronic device transmitting the first probe request is a Wi-Fi P2P device or a legacy device.

15. The electronic device of claim 14,
wherein the first probe response includes P2P group information, if the at least one other electronic device is the Wi-Fi P2P device; and wherein the first probe response does not include the P2P group information, if the at least one other electronic device is the legacy device.

16. The electronic device of claim 14,
wherein the first probe request transmitted from the Wi-Fi P2P device includes a P2P information element, and
wherein the first probe request transmitted from the legacy device does not include the P2P information element.

17. The electronic device of claim 16, wherein the P2P group information comprises at least one of a P2P information element and a P2P device identification.

18. The electronic device of claim 13, wherein the controller is further configured to control the communication unit to transmit a beacon notifying of a Timing Synchronization Function (TSF) for timing synchronization to the specific device, when transmitting the probe response.

19. The electronic device of claim 12, wherein the controller is further configured to control the communication unit to:
transmit a second probe request over social channels; and
control the communication unit to receive a second probe response transmitted from at least one other electronic device in response to the second probe request.

20. The electronic device of claim 12, wherein the controller is further configured to configure the electronic device to enter a third mode where the electronic device is configured to scan all of channels.

21. The electronic device of claim 12, wherein the controller is further configured to negotiate with the at least one other electronic device for configuring the group owner.

22. The electronic device of claim 12, wherein the controller is further configured to:
receive a command issued by a user for inviting a P2P group, if the electronic device discovers at least one other electronic device;
control the communication unit to transmit an invitation request to the discovered at least one other electronic device; and
establish the Wi-Fi P2P connection between the electronic device and the discovered at least one other electronic device, upon receipt of an invitation response transmitted from the discovered at least one other electronic device.

\* \* \* \* \*